(12) United States Patent
Yoshitani et al.

(10) Patent No.: US 10,243,373 B2
(45) Date of Patent: Mar. 26, 2019

(54) POWER CONTROL SYSTEM, POWER CONTROL DEVICE, SERVER DEVICE, AND METHOD FOR CONTROLLING POWER CONTROL SYSTEM

(71) Applicant: KYOCERA CORPORATION, Kyoto (JP)

(72) Inventors: Naohisa Yoshitani, Yokohama (JP); Taku Nakayama, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 772 days.

(21) Appl. No.: 14/410,863

(22) PCT Filed: Jul. 10, 2013

(86) PCT No.: PCT/JP2013/004268
§ 371 (c)(1),
(2) Date: Dec. 23, 2014

(87) PCT Pub. No.: WO2014/010241
PCT Pub. Date: Jan. 16, 2014

(65) Prior Publication Data
US 2015/0200545 A1 Jul. 16, 2015

(30) Foreign Application Priority Data
Jul. 11, 2012 (JP) ................................. 2012-156020

(51) Int. Cl.
*G05D 3/12* (2006.01)
*G05D 5/00* (2006.01)
(Continued)

(52) U.S. Cl.
CPC ................ *H02J 4/00* (2013.01); *G05B 15/02* (2013.01); *H04L 12/283* (2013.01); *H04L 12/2818* (2013.01); *H04L 2012/285* (2013.01)

(58) Field of Classification Search
None
See application file for complete search history.

(56) References Cited

U.S. PATENT DOCUMENTS 4,868,866 A * 9/1989 Williams, Jr. ......... G06Q 40/00
340/4.5
7,751,425 B2 * 7/2010 Shoji ................... H04L 41/0686
370/449
(Continued)

FOREIGN PATENT DOCUMENTS

EP 2 456 084 A1 5/2012
JP 2001-186088 A 7/2001
(Continued)

OTHER PUBLICATIONS

Extended European Search Report dated Feb. 19, 2016 issued by the European Patent Office for 13817223.4.
(Continued)

*Primary Examiner* — Eric C Wai
(74) *Attorney, Agent, or Firm* — Procopio Cory Hargreaves and Savitch LLP

(57) ABSTRACT

Provided are a power control system, power control device, server device, and method for controlling a power control system in which the power control device can control load devices even when communication between the power control device and the server device is cut off, and which allow for timely discovery that communication has been cut off. A server device (20) extracts at least one of an elapsed time and remaining number of control instructions not acquired by a power control device (10) by polling and provides a warning when at least one of the elapsed time and the remaining number is at least a predetermined value. When the server device does not respond to polling, the power control device (10) creates a control instruction based on
(Continued)

control guideline information and executes the control instruction.

15 Claims, 4 Drawing Sheets

(51) Int. Cl.
  *G05D 9/00* (2006.01)
  *G05D 11/00* (2006.01)
  *G05D 17/00* (2006.01)
  *H02J 4/00* (2006.01)
  *H04L 12/28* (2006.01)
  *G05B 15/02* (2006.01)

(56) References Cited

U.S. PATENT DOCUMENTS

| | | |
|---|---|---|
| 2001/0006428 A1 | 7/2001 | Mizuno |
| 2003/0204756 A1 | 10/2003 | Ranson et al. |
| 2004/0127997 A1* | 7/2004 | Tajika .................. G05B 19/042 700/12 |
| 2011/0264245 A1* | 10/2011 | Lim ........................ H04L 12/12 700/90 |
| 2013/0073079 A1* | 3/2013 | Ouchi .................... B25J 9/1656 700/245 |

FOREIGN PATENT DOCUMENTS

| | | |
|---|---|---|
| JP | 2006-191340 A | 7/2006 |
| JP | 2007-336180 A | 12/2007 |
| JP | 2009-260913 A | 11/2009 |
| JP | 2012-129655 A | 7/2012 |

OTHER PUBLICATIONS

International Search Report; PCT/JP2013/004268; dated Oct. 15, 2013.

Written Opinion of the International Searching Authority; PCT/JP2013/004268; dated Oct. 15, 2013; with concise explanation.

* cited by examiner

POWER CONTROL SYSTEM, POWER CONTROL DEVICE, SERVER DEVICE, AND METHOD FOR CONTROLLING POWER CONTROL SYSTEM

CROSS-REFERENCE TO RELATED APPLICATION

This application claims priority to and the benefit of Japanese Patent Application No. 2012-156020 filed Jul. 11, 2012, the entire contents of which are incorporated herein by reference.

TECHNICAL FIELD

The present invention relates to a power control system, power control device, server device, and method for controlling a power control system in which a power control device controls a load device based on a control instruction from a server device.

BACKGROUND

In recent years, a system has been proposed for controlling various devices from a remote location over the Internet (see Patent Literature 1). In order for a server to control devices directly in the context of device control over a network such as the Internet, it is necessary to assign each device a unique identification number, such as a global IP address, that uniquely specifies a device that is the target of control. As compared to the number of devices that are the target of control, the number of unique identification numbers is limited. Hence, assigning a unique identification number to every control device might deplete the supply of identification numbers.

A system has therefore been proposed whereby when controlling devices over a network such as the Internet, a local control device accesses a server and reads a control instruction from the server, and based on the read control instruction, a local power control device controls load devices (see Patent Literature 2). In such a configuration where a local control device acquires control instructions by polling in order to control devices, assigning a unique identification number to each device is not necessary.

CITATION LIST

Patent Literature 1: JP 2007-336180 A
Patent Literature 2: JP 2009-260913 A

SUMMARY

Conventionally, however, since the power control device controls load devices based on control instructions from the server, the power control device cannot acquire control instructions from the server when communication between the server and the power control device is cut off, making it impossible to control the load devices. Furthermore, there is no means for timely discovery that communication between the server and the power control device has been cut off, and the contract power might be exceeded.

The present invention has been conceived in light of the above problems and provides a power control system, power control device, server device, and method for controlling a power control system in which the power control device can control load devices even when communication between the power control device and the server is cut off, and which allow for timely discovery that communication has been cut off.

In order to resolve the above problems, a power control system according to the present invention includes: a power control device; and a server device, the power control device acquiring a control instruction by polling the server device, the server device extracting at least one of an elapsed time and a remaining number of control instructions not acquired by the power control device by the polling and providing a warning when at least one of the elapsed time and the remaining number is at least a predetermined value, and when the server device does not respond to polling, the power control device creating a control instruction based on control guideline information and executing the control instruction.

In the power control system according to the present invention, upon receipt of polling from the power control device, the server device may change a status of the control instruction acquired by the power control device by the polling and store the status in a controller queue, and the server device may extract at least one of the elapsed time and the remaining number of control instructions based on the status of the control instruction stored in the controller queue.

In the power control system according to the present invention, upon receipt of polling from the power control device, the server device may delete the control instruction acquired by the power control device by the polling from a controller queue, and based on any control instructions remaining in the controller queue, extract at least one of the elapsed time and the remaining number of control instructions not acquired by the polling.

In the power control system according to the present invention, the power control device may acquire the control guideline information from the server device.

A power control device according to the present invention includes: a storage unit configured to store control guideline information; a control instruction creation unit configured to create a control instruction based on the control guideline information when a server device does not respond to polling; and a control unit configured to execute the control instruction.

The power control device according to the present invention may acquire the control guideline information from the server device.

A server device according to the present invention is a server device in a power control system including a power control device and the server device, the power control device acquiring a control instruction by polling the server device, the server device including: a controller queue configured to store a control instruction; and a notification unit configured to extract at least one of an elapsed time and remaining number of control instructions not acquired by the polling and to provide a warning when at least one of the elapsed time and the remaining number is at least a predetermined value.

The server device according to the present invention may further include a controller configured to change, upon receipt of polling from the power control device, a status of the control instruction acquired by the power control device by the polling and to store the status in the controller queue, and the notification unit may extract at least one of the elapsed time and the remaining number of control instructions not acquired by the polling based on the status of the control instruction stored in the controller queue.

The server device according to the present invention may further include a controller configured to delete, upon receipt of polling from the power control device, the control instruction acquired by the power control device by the polling from the controller queue, and the notification unit may extract at least one of the elapsed time and the remaining number of control instructions not acquired by the polling based on any control instructions remaining in the controller queue.

A method according to the present invention for controlling a power control system including a power control device and a server device includes the steps of: the power control device acquiring a control instruction by polling the server device; the server device extracting at least one of an elapsed time and remaining number of control instructions not acquired by the polling and providing a warning when at least one of the elapsed time and the remaining number is at least a predetermined value; and when the server device does not respond to polling, the power control device creating a control instruction based on control guideline information and executing the control instruction.

The method according to the present invention for controlling a power control system may further include the step of the server device, upon receipt of polling from the power control device, changing a status of the control instruction acquired by the power control device by the polling and storing the status in a controller queue, and the server device may extract at least one of the elapsed time and the remaining number of control instructions not acquired by the polling based on the status of the control instruction stored in the controller queue.

The method according to the present invention for controlling a power control system may further include the step of the server device, upon receipt of polling from the power control device, deleting the control instruction acquired by the power control device by the polling from the controller queue, and the server device may extract at least one of the elapsed time and the remaining number of control instructions not acquired by the polling based on any control instructions remaining in the controller queue.

The method according to the present invention for controlling a power control system may further include the step of the power control device acquiring the control guideline information from the server device.

According to the power control system, power control device, server device, and method for controlling a power control system according to the present invention, the power control device can control load devices even when communication between the power control device and the server device is cut off, and timely discovery that communication has been cut off is possible.

BRIEF DESCRIPTION OF DRAWINGS

The present invention will be further described below with reference to the accompanying drawings, wherein.

DESCRIPTION OF EMBODIMENTS

The following describes embodiments of the present invention.

Embodiment 1

Figure 1:
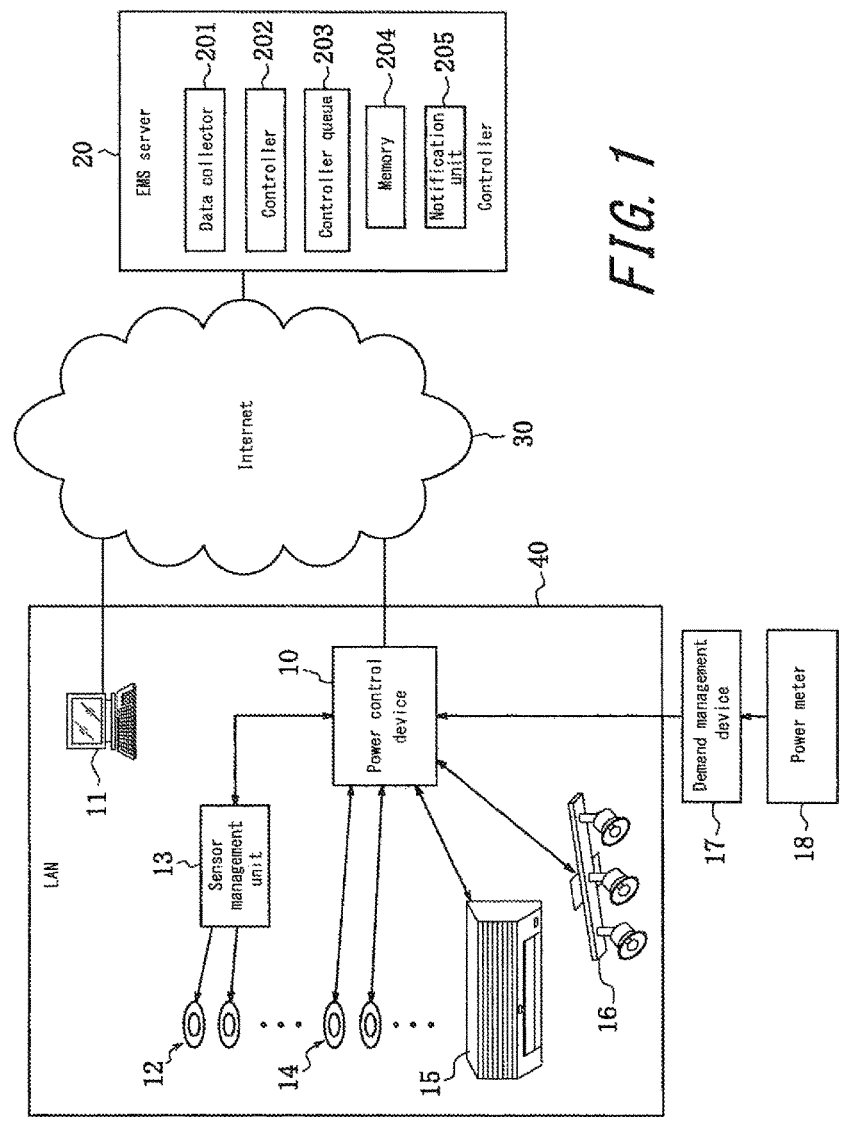
FIG. 1 schematically illustrates the structure of a power control system according to Embodiment 1.

First, a power control system, according to Embodiment 1 of the present invention, that includes a power control device is described. FIG. 1 is a communication system structure diagram schematically illustrating the structure of a power control system, according to an embodiment of the present invention, that includes a power control device.

As illustrated in FIG. 1, overall the power control system includes a power control device 10, a user terminal 11, and an Energy Management System (EMS) server 20 that is a server device.

The power control device 10, the user terminal 11, and the EMS server 20 are connected over the Internet 30 and exchange signals for data, control instructions, and the like. The power control device 10 and the user terminal 11 are located within a Local Area Network (LAN) 40.

The power control device 10 is, for example, an EMS Gateway. The power control device 10 periodically transmits a measured value, such as the power consumption detected by the below-described sensor, to the EMS server 20. By polling, the power control device 10 acquires, from the EMS server 20, control instructions for the load devices located within the LAN 40. Based on the control instructions received from the EMS server 20, the power control device 10 controls the load devices located within the LAN 40.

The user terminal 11 includes a display device and can display the measured value measured by the sensor located in the LAN 40 as well as the operation status of the load devices located in the LAN 40. When displaying the measured value and the control status, the user terminal 11 acquires data from the EMS server 20 by HTTP, and the web browser on the user terminal 11 creates a measured value display page. The user terminal 11 also issues control instructions to the load devices in the LAN 40. The issuing of control instructions is based on detection of user operation on a device control page configured by the web browser. The user terminal 11 transmits the issued control instructions to the EMS server 20.

The EMS server 20 receives and stores the measured values transmitted from the power control device 10. The EMS server 20 also receives the control instructions issued by the user terminal 11. Additionally, the EMS server 20 creates a control instruction for each load device. The received control instructions and the created control instructions are read by the power control device 10 by polling. The EMS server 20 also receives and updates registration of sensor information located in the LAN 40.

The EMS server 20 includes a data collector 201, a controller 202, a controller queue 203, a memory 204, and a notification unit 205.

The data collector 201 periodically collects and stores or updates measured values and sensor registration information.

The controller 202 creates the control instruction for each load device with a variety of algorithms in order to achieve a variety of purposes. The controller queue 203 stores the control instructions received from the user terminal 11 and the control instructions created by the controller 202. The controller queue 203 also stores the status of each control instruction. The status indicates whether the control instruction has been acquired by the power control device 10. When the control instruction has been acquired, the status is "acquired", whereas when the control instruction has not been acquired, the status is "not acquired". Upon receipt of polling from the power control device 10, the controller 202 changes the status of the control instruction acquired by the power control device 10 by the polling from "not acquired" to "acquired" and stores the status in the controller queue 203.

The controller 202 also periodically monitors the status of the control instructions stored in the controller queue 203 to infer whether communication between the power control device 10 and the EMS server 20 has been cut off.

Specifically, the controller 202 extracts the elapsed time of any control instructions, stored in the controller queue 203, for which the status is "not acquired". The controller 202 causes the below-described notification unit 205 to provide a warning when the elapsed time is at least a predetermined time.

Instead of the elapsed time of the control instructions, the controller 202 may extract the remaining number of control instructions for which the status is "not acquired". In this case, the controller 202 causes the below-described notification unit 205 to provide a warning when the remaining number of control instructions for which the status is "not acquired" is at least a predetermined value. The predetermined value is preferably the result of multiplying the remaining time in a 30 minute demand by a predetermined constant. The predetermined value may also be the result of multiplying the difference between the upper limit of a 30 minute demand and the integral power of a 30 minute demand by a predetermined constant.

The controller 202 may also extract both the elapsed time and the remaining number of control instructions for which the status is "not acquired". In this case, the controller 202 may cause the notification unit 205 to provide a warning when at least one of the elapsed time and the remaining number of control instructions not acquired by polling is at least a predetermined value.

The memory 204 stores a variety of data used by the controller 202 to create the control instructions.

The notification unit 205 provides a warning in response to control by the controller 202. The notification unit 205 preferably provides the warning by sending e-mail to the user terminal 11. The notification unit 205 may also provide a warning by sending e-mail to the terminal for the administrator of the EMS server 20 or to the terminal for the administrator of the power control device 10.

Next, the transmission of measured values and the control of load devices by the power control device 10 is described. A first sensor 12, a sensor management unit 13, a second sensor 14, a third sensor 19, load devices 15 and 16, the power control device 10, and the user terminal 11 are located in the LAN 40. The power control device 10 is connected to a demand management device 17 and a power meter 18. FIG. 1 illustrates an example with two load devices, yet this example is not limiting. There may be one load device, or three or more.

The first sensor 12 is any sensor such as a current sensor, power sensor, temperature sensor, or illumination sensor and detects a measured value related to the drive status of the load devices 15 and 16 located in the LAN 40.

The sensor management unit 13 detects the measured value from the first sensor 12. The sensor management unit 13 communicates periodically with the power control device 10 by a standard protocol such as ZigBee (registered trademark) Smart Energy Profile 2.0 (SEP 2.0) or Echonet (registered trademark).

The second sensor 14 is any sensor such as a current sensor, power sensor, temperature sensor, or illumination sensor and detects a measured value related to the drive status of the load devices 15 and 16 located in the LAN 40. Unlike the first sensor 12, the second sensor communicates with the power control device 10 by a unique protocol.

The third sensor 19 is any sensor such as a current sensor, power sensor, temperature sensor, or illumination sensor and detects a measured value related to the drive status of the load devices 15 and 16 located in the LAN 40a. Unlike the first sensor 12 and the second sensor 14, the third sensor 19 communicates directly with the power control device 10 by a standard protocol such as SEP 2.0 or Echonet (registered trademark).

The load devices 15 and 16 are devices driven by electrical power, such as an air conditioner, lighting appliance, or refrigerator. The operation status of the load devices 15 and 16 is adjustable, for example by temperature adjustment or illumination intensity adjustment, and the power consumption of the load devices 15 and 16 varies in accordance with such adjustments. The load devices 15 and 16 communicate with the power control device 10 by a standard protocol such as SEP 2.0 or Echonet (registered trademark).

As described above, the power control device 10 can communicate with the sensor management unit 13 and the second sensor 14 and periodically transmits the measured values from the first sensor 12 and the second sensor 14 to the EMS server 20 over the Internet 30. As also described above, by polling, the power control device 10 acquires, from the EMS server 20, control instructions for the load devices 15 and 16 located within the LAN 40 to which the power control device 10 belongs, and based on the control instructions, controls the operation status of the load devices 15 and 16.

The power control device 10 recognizes the start of a demand time period from the output of the demand management device 17. As described below, the power control device 10 also acquires, from the output of the demand management device 17, the current value of power consumption by all of the load devices (including the load devices 15 and 16) within the LAN 40 during the current demand time period.

As described above, the user terminal 11 displays the measured values from the first sensor 12 and the second sensor 14 that are located in the LAN 40 and displays the operation status of the load devices 15 and 16. As also described above, the user terminal 11 allows for direct control instructions for the load devices 15 and 16, such as directly setting the temperature or the illumination intensity.

The power meter 18 measures the cumulative power consumption for each store during the demand time period (demand power (power usage)). The demand time period is a standard time period used in a contractual power agreement between the business operator (consumer) that runs a store or the like and the power company. For example, when the demand time period is 30 minutes and the contract power is 300 kW, the contract is considered to be fulfilled as long as the 30 minute average is less than 300 kW, even if the power consumption temporarily exceeds 300 kW during any demand time period. The power meter 18 resets the demand power at the start of a demand time period and measures the demand power from the start of the demand time period to the present. By measuring the power consumption at the end of a demand time period, the demand power during that demand time period can be measured. The demand management device 17 reads a pulse output by the power meter 18 and outputs the read pulse to the power control device 10.

Figure 2:
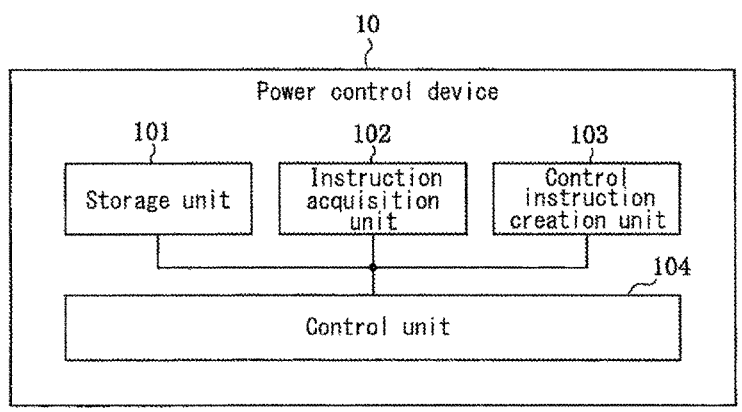
FIG. 2 is a functional block diagram of a power control device according to Embodiment 1.

FIG. 2 is a detailed functional block diagram of the power control device 10 according to an embodiment of the present invention. The power control device 10 includes a storage unit 101, an instruction acquisition unit 102, a control instruction creation unit 103, and a control unit 104.

The storage unit 101 stores control guideline information. The control guideline information is information serving as a guideline for power control and is created based on climate and other environmental data, past power consumption, measured data corresponding to each control instruction, and the like. The control guideline information may be stored in advance at the time of system operation or may be acquired periodically from the EMS server 20. In the case of periodic acquisition from the EMS server 20, control guideline information stored in the memory 204 of the EMS server 20 is acquired.

The instruction acquisition unit 102 acquires a control instruction from the EMS server 20 by periodic polling.

When the EMS server does not respond to polling, the control instruction creation unit 103 creates a control instruction based on the control guideline information stored in the storage unit 101.

The control unit 104 executes a variety of control pertaining to the power control device 10. Specifically, the control unit 104 determines whether the EMS server 20 responds to polling by the instruction acquisition unit 102. When the EMS server 20 does not respond to polling, the control unit 104 causes the control instruction creation unit 103 to create a control instruction. The control unit 104 executes a control instruction acquired by polling. The control unit 104 also executes the control instruction created by the control instruction creation unit 103.

Figure 3:
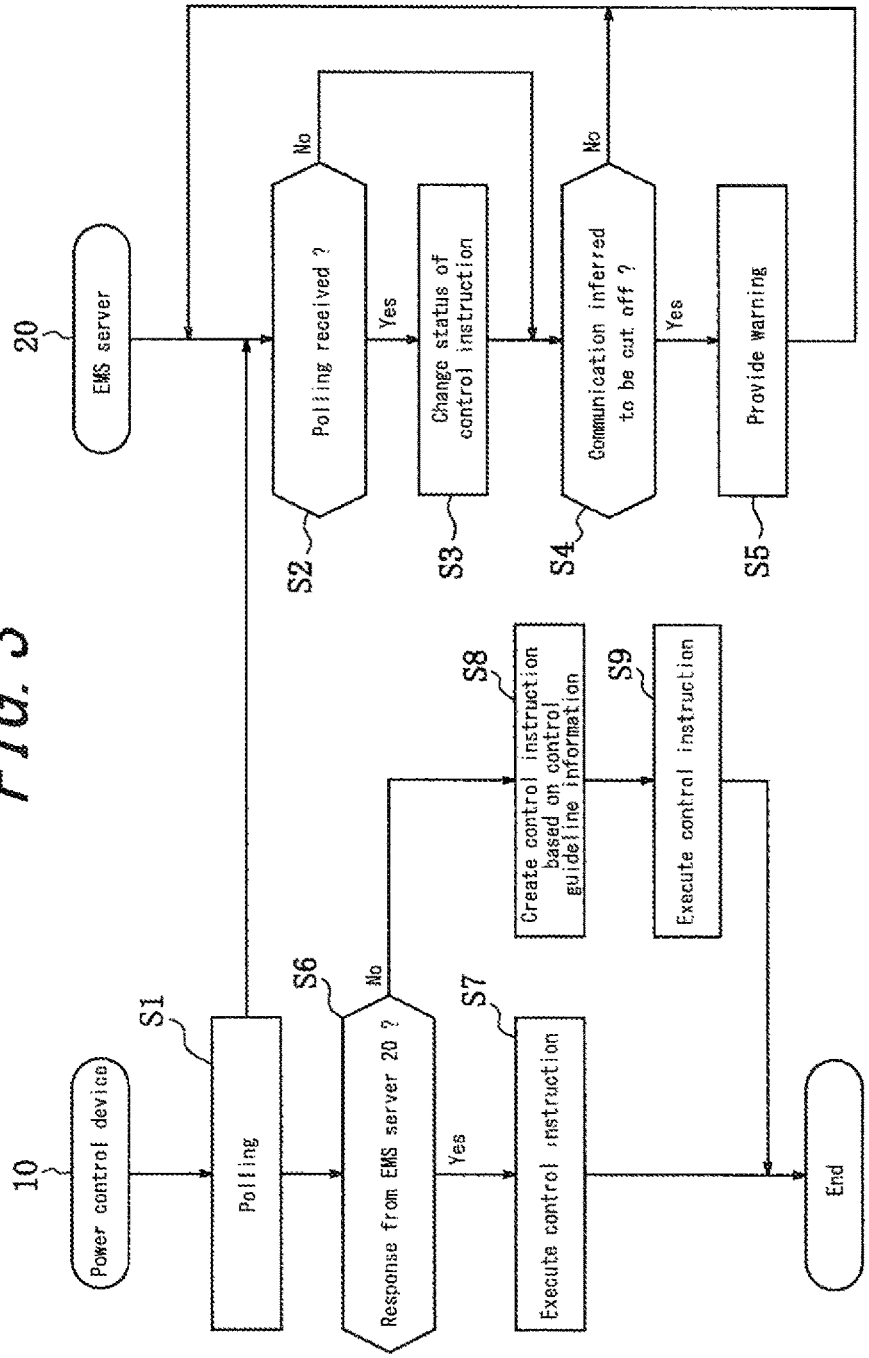
FIG. 3 is a flowchart of operations by a power control device according to Embodiment 1.

Next, operations of the power control system according to Embodiment 1 of the present invention are described using the flowchart in FIG. 3.

First, the instruction acquisition unit 102 of the power control device 10 performs polling (step S1).

Next, the controller 202 of the EMS server 20 determines whether polling has been received (step S2). Upon receipt of polling from the power control device 10, the controller 202 changes the status of the control instruction acquired by the power control device 10 by the polling from "not acquired" to "acquired" and stores the status in the controller queue 203 (step S3). Conversely, when polling has not been received, processing skips step S3 and proceeds to step S4.

Next, the controller 202 periodically monitors the status of the control instructions stored in the controller queue 203 to infer whether communication between the power control device 10 and the EMS server 20 has been cut off (step S4). Specifically, the controller 202 extracts the elapsed time of any control instructions, stored in the controller queue 203, for which the status is "not acquired". The controller 202 causes the below-described notification unit 205 to provide a warning when the elapsed time is at least a predetermined time. Instead of the elapsed time of the control instructions, the controller 202 may extract the remaining number of control instructions for which the status is "not acquired". In this case, the controller 202 causes the below-described notification unit 205 to provide a warning when the remaining number of control instructions for which the status is "not acquired" is at least a predetermined value. The predetermined value is preferably the result of multiplying the remaining time in a 30 minute demand by a predetermined constant. The predetermined value may also be the result of multiplying the difference between the upper limit of a 30 minute demand and the integral power of a 30 minute demand by a predetermined constant. The controller 202 may also cause the notification unit 205 to provide a warning when at least one of the elapsed time and the remaining number of control instructions not acquired by polling is at least a predetermined value.

When it is determined in step S4 that communication has been cut off, the notification unit 205 provides a warning in response to control by the controller 202 (step S5). The notification unit 205 preferably provides the warning by sending e-mail to the user terminal 11 over a channel that has not been cut off. The notification unit 205 may also provide a warning by sending e-mail to the terminal for the administrator of the EMS server 20 or to the terminal for the administrator of the power control device 10. Next, processing returns to step S2, and the EMS server 20 repeats the processing from steps S2 to S5. When it is inferred in step S4 that communication has not been cut off, processing skips step S5. Processing then returns to step S2, and the EMS server 20 repeats the processing from steps S2 to S5.

After the polling in step S1, the control unit 104 of the power control device 10 determines whether the EMS server 20 has responded to polling by the instruction acquisition unit 102 (step S6). When the EMS server 20 has responded, the control unit 104 executes the control instruction acquired by polling (step S7), and processing terminates.

Conversely, when the EMS server 20 has not responded to polling in step S6, the control unit 104 causes the control instruction creation unit 103 to create a control instruction. The control instruction creation unit 103 creates the control instruction based on the control guideline information stored in the storage unit 101 (step S8).

Next, the control unit 104 executes the control instruction created by the control instruction creation unit 103 (step S9).

According to the present invention, when the EMS server 20 does not respond, the power control device 10 thus creates and executes a control instruction based on the control guideline information. Therefore, even when communication is cut off between the power control device 10 and the EMS server 20, the power control device can control load devices. Furthermore, the EMS server 20 periodically monitors the status of the control instructions stored in the controller queue 203 to infer whether communication has been cut off and provide a warning. Hence, timely discovery that communication has been cut off is possible.

In step S9, the control unit 104 may record the measured data, such as an executed control instruction and the power reduction amount due to that control instruction, in the storage unit 101 as a log. After the communication connection is restored, the control unit 104 may transmit the control instructions and measured data recorded in the storage unit 101 as a log to the EMS server 20. When the power control device 10 is configured to acquire the control guideline information from the EMS server 20, the EMS server 20 may update the control guideline information based on the control instructions and measured data transmitted from the power control device 10 after the communication connection is restored. This approach allows for improved accuracy of the control guideline information.

Embodiment 2

The following describes Embodiment 2 of the present invention. The same reference signs are used for the same components as in Embodiment 1, and a description thereof is omitted. As compared to the configuration of Embodiment 1, the processing by the controller 202 of the EMS server 20 differs in the power control system in Embodiment 2.

Another difference is that the controller queue 203 does not store the status of each control instruction.

The controller 202 creates the control instruction for each load device with a variety of algorithms in order to achieve a variety of purposes. The controller queue 203 stores the control instructions received from the user terminal 11 and the control instructions created by the controller 202.

Upon receipt of polling from the power control device 10, the controller 202 of the EMS server 20 deletes the control instruction acquired by the power control device 10 by the polling from the controller queue 203.

The controller 202 also periodically monitors the control instructions stored in the controller queue 203 to infer whether communication between the power control device 10 and the EMS server 20 has been cut off.

Specifically, the controller 202 monitors the elapsed time of any control instructions stored in the controller queue 203. The controller 202 causes the below-described notification unit 205 to provide a warning when the elapsed time is at least a predetermined time.

Instead of the elapsed time of the control instructions, the controller 202 may monitor the remaining number of control instructions. In this case, the controller 202 causes the below-described notification unit 205 to provide a warning when the remaining number of control instructions is at least a predetermined value. The predetermined value is preferably the result of multiplying the remaining time in a 30 minute demand by a predetermined constant. The predetermined value may also be the result of multiplying the difference between the upper limit of a 30 minute demand and the integral power of a 30 minute demand by a predetermined constant.

The controller 202 may also monitor both the elapsed time and the remaining number of control instructions. In this case, the controller 202 may cause the notification unit 205 to provide a warning when at least one of the elapsed time and the remaining number of control instructions not acquired by polling is at least a predetermined value.

Figure 4:
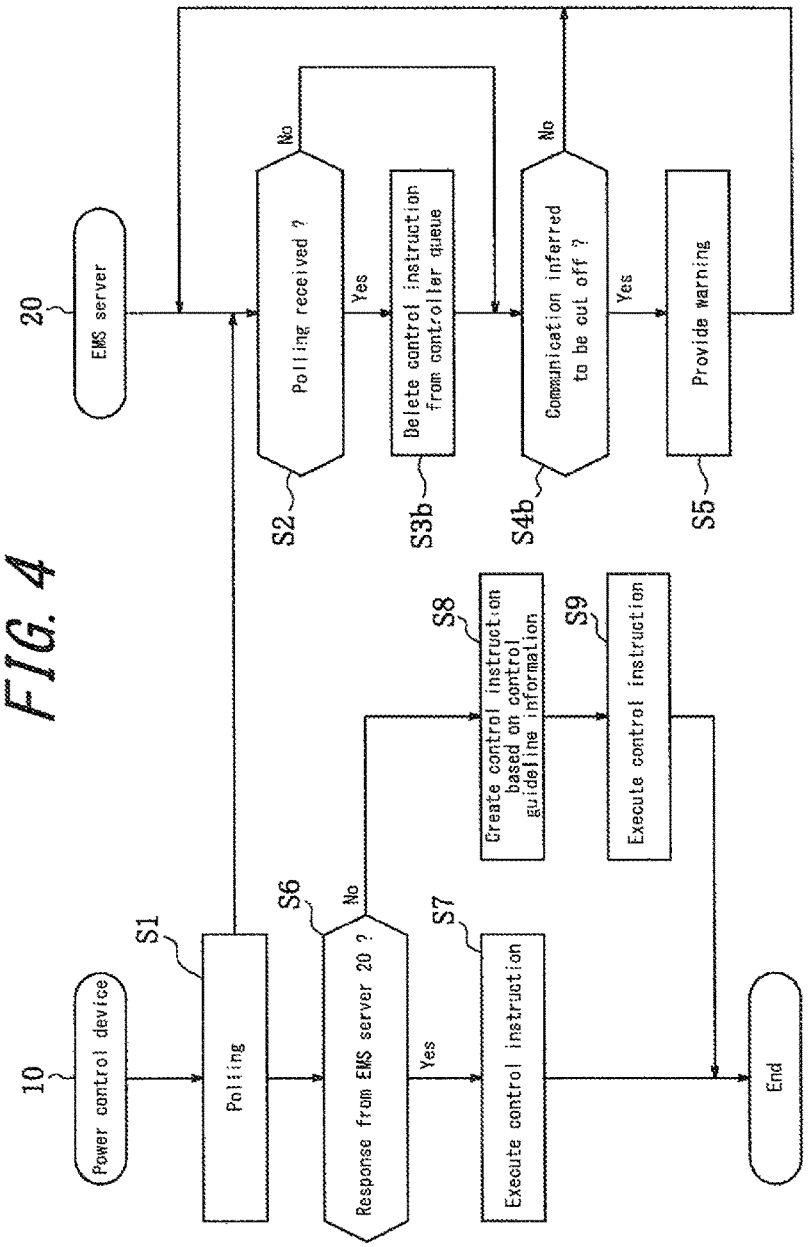
FIG. 4 is a flowchart of operations by a power control device according to Embodiment 2.

Next, operations of the power control system according to Embodiment 2 of the present invention are described using the flowchart in FIG. 4. The same reference signs are used for the same operations as in the power control system according to Embodiment 1, and a description thereof is omitted.

In the power control system according to Embodiment 2, after step S2, upon receipt of polling from the power control device 10, the controller 202 deletes the control instruction acquired by the power control device 10 by the polling from the controller queue 203 (step S3b). Conversely, when polling has not been received, processing skips step S3b and proceeds to step S4b.

Next, the controller 202 periodically monitors the control instructions stored in the controller queue 203 to infer whether communication between the power control device 10 and the EMS server 20 has been cut off (step S4b). Specifically, the controller 202 monitors the elapsed time of any control instructions stored in the controller queue 203. The controller 202 causes the below-described notification unit 205 to provide a warning when the elapsed time is at least a predetermined time. Instead of the elapsed time of the control instructions, the controller 202 may monitor the remaining number of control instructions. In this case, the controller 202 causes the below-described notification unit 205 to provide a warning when the remaining number of control instructions is at least a predetermined value. The predetermined value is preferably the result of multiplying the remaining time in a 30 minute demand by a predeter-mined constant. The predetermined value may also be the result of multiplying the difference between the upper limit of a 30 minute demand and the integral power of a 30 minute demand by a predetermined constant. Operations from step S5 onwards are the same as in Embodiment 1.

According to the present invention, when the EMS server 20 does not respond, the power control device 10 thus creates and executes a control instruction based on the control guideline information. Therefore, even when communication is cut off between the power control device 10 and the EMS server 20, the power control device can control load devices. Furthermore, the EMS server 20 periodically monitors the control instructions stored in the controller queue 203 to infer whether communication has been cut off and provide a warning. Hence, timely discovery that communication has been cut off is possible.

Although the present invention has been described based on embodiments and the accompanying drawings, it is to be noted that various changes and modifications will be apparent to those skilled in the art based on the present disclosure. Therefore, such changes and modifications are to be understood as included within the scope of the present invention. For example, the functions and the like included in the various units, steps, and the like may be reordered in any logically consistent way. Furthermore, units, steps, and the like may be combined into one or divided.

REFERENCE SIGNS LIST

10: Power control device
101: Storage unit
102: Instruction acquisition unit
103: Control instruction creation unit
104: Control unit
105: Recording unit
11: User terminal
12: First sensor
13: Sensor management unit
14: Second sensor
15 to 16: Load device
17: Demand management device
18: Power meter
19: Third sensor
20: EMS server (server device)
30: Internet
40: LAN
201: Data collector
202: Controller
203: Controller queue
204: Memory
205: Notification unit

The invention claimed is:

1. A power control system comprising:
a power control device; and
a server device,
wherein
the power control device acquires a control instruction by polling the server device,
the server device extracts a remaining number of control instructions not acquired by the power control device by the polling and provides a warning when the remaining number is at least a predetermined value,
when the server device does not respond to polling, the power control device creates a control instruction based on control guideline information and executes the control instruction, wherein the control guideline information is information serving as a guideline for power control performed by the power control device to a load device, the power control device executes the control instruction to perform power control in respect of the load device, and the power control device acquires the control guideline information periodically from the server device.

2. The power control system according to claim 1, wherein upon receipt of polling from the power control device, the server device changes a status of the control instruction acquired by the power control device by the polling and stores the status in a controller queue, and the server device extracts the remaining number of the control instructions not acquired by the power control device by the polling based on the status of the control instruction stored in the controller queue.

3. The power control system according to claim 1, wherein upon receipt of polling from the power control device, the server device deletes the control instruction acquired by the power control device by the polling from a controller queue, and based on any control instructions remaining in the controller queue, extracts the remaining number of the control instructions not acquired by the power control device by the polling.

4. The power control system according to claim 1, wherein the power control device executes the control instruction to control power consumption of the load device.

5. The power control system according to claim 1, wherein the control guideline information is created based on at least one of climate and other environmental data, past power consumption, and measured data corresponding to each control instruction.

6. A power control device comprising:
a storage unit configured to store control guideline information;
a control unit configured to perform polling of a server to acquire control instructions; and
a control instruction creation unit configured to create a control instruction based on the control guideline information when a server device does not respond to the polling by the control unit, wherein the control guideline information is information serving as a guideline for power control performed by the power control device to a load device; and
wherein
the control unit is configured to execute the control instruction,
the power control device executes the control instruction to perform power control in respect of the load device, and
the power control device acquires the control guideline information periodically from the server device.

7. The power control device according to claim 6, wherein the control guideline information is created based on at least one of climate and other environmental data, past power consumption, and measured data corresponding to each control instruction.

8. A server device in a power control system comprising a power control device and the server device, the power control device acquiring a control instruction by polling the server device, the server device comprising:
a controller queue configured to store at least one control instruction; and
a notification unit configured to extract a remaining number of control instructions not acquired by the polling and to provide a warning when the remaining number is at least a predetermined value, and
wherein
when the server device does not respond to polling, the power control device creates a control instruction based on control guideline information and executes the control instruction, wherein the control guideline information is information serving as a guideline for power control performed by the power control device to a load device,
the power control device executes the control instruction to perform power control in respect of the load device, and
the server transmits the control guideline information periodically to the power control device.

9. The server device according to claim 8, further comprising: a controller configured to change, upon receipt of polling from the power control device, a status of the control instruction acquired by the power control device by the polling and to store the status in the controller queue, wherein the notification unit extracts the remaining number of the control instructions not acquired by the polling based on the status of the control instruction stored in the controller queue.

10. The server device according to claim 8, further comprising: a controller configured to delete, upon receipt of polling from the power control device, the control instruction acquired by the power control device by the polling from the controller queue, wherein the notification unit extracts the remaining number of control instructions not acquired by the polling based on any control instructions remaining in the controller queue.

11. The server device according to claim 8, wherein the control guideline information is created based on at least one of climate and other environmental data, past power consumption, and measured data corresponding to each control instruction.

12. A method for controlling a power control system comprising a power control device and a server device, comprising the steps of:
the power control device acquiring a control instruction by polling the server device;
the server device extracting a remaining number of control instructions not acquired by the polling and providing a warning when the remaining number is at least a predetermined value;
when the server device does not respond to polling, the power control device creating a control instruction based on control guideline information and executing the control instruction wherein the control guideline information is information serving as a guideline for power control performed by the power control device to a load device,
the power control device executing the control instruction to perform power control in respect of the load device, and
the power control device acquiring the control guideline information periodically from the server device.

13. The method according to claim 12, further comprising the step of: the server device, upon receipt of polling from the power control device, changing a status of the control instruction acquired by the power control device by the polling and storing the status in a controller queue, wherein the server device extracts the remaining number of control instructions not acquired by the polling based on the status of the control instruction stored in the controller queue.

14. The method according to claim 12, further comprising the step of: the server device, upon receipt of polling from the power control device, deleting the control instruction acquired by the power control device by the polling from the controller queue, wherein the server device extracts the remaining number of control instructions not acquired by the polling based on any control instructions remaining in the controller queue.

15. The method according to claim 12, wherein the control guideline information is created based on at least one of climate and other environmental data, past power consumption, and measured data corresponding to each control instruction.

* * * * *